(12) United States Patent
Amici

(10) Patent No.: US 7,303,451 B1
(45) Date of Patent: Dec. 4, 2007

(54) DRIVE UNIT, PARTICULARLY FOR BOATS

(75) Inventor: Alberto Amici, Pavia (IT)

(73) Assignee: R.T.N. S.r.L., Borgonove V.T. (IT)

( * ) Notice: Subject to any disclaimer, the term of this patent is extended or adjusted under 35 U.S.C. 154(b) by 0 days.

(21) Appl. No.: 11/727,705

(22) Filed: Mar. 28, 2007

(30) Foreign Application Priority Data

Mar. 31, 2006 (IT) .......................... PC2006A0018

(51) Int. Cl.
*B63H 20/14* (2006.01)
(52) U.S. Cl. .......................................... 440/75; 74/323
(58) Field of Classification Search ................. 440/75; 74/323

See application file for complete search history.

(56) References Cited

U.S. PATENT DOCUMENTS

| | | | | |
|---|---|---|---|---|
| 4,986,774 A | * | 1/1991 | Wantz | .......................... 440/75 |
| 5,716,247 A | * | 2/1998 | Ogino | .......................... 440/75 |
| 5,839,928 A | * | 11/1998 | Nakayasu et al. | ............ 440/75 |
| 7,010,994 B2 | * | 3/2006 | Amici | .......................... 74/323 |
| 7,125,296 B2 | * | 10/2006 | Yazaki et al. | .................. 440/75 |
| 2003/0224671 A1 | * | 12/2003 | Katayama et al. | ............ 440/75 |

\* cited by examiner

*Primary Examiner*—Stephen Avila
(74) *Attorney, Agent, or Firm*—Young & Thompson

(57) ABSTRACT

A drive unit comprising a transmission with two coaxial bevel gears (11, 12) fitted opposite one another on the same engine shaft (10), which engage a bevel gear (13) fitted to a shaft (14) perpendicular to the preceding one, a device designed to mesh the engine shaft with one or other of the bevel gears, constituted by clutches (20, 21) housed in the body of the bevel gears (12, 11) and controlled by a pressurised fluid, wherein pipes (24, 25), designed to convey the pressurised fluid, are formed in the engine shaft (10), wherein, in order to supply pressurised oil to the pipes (24, 25), an axial inlet pipe (34) is formed in the head of the engine shaft (10), which the axial pipe (34) feeds a distributor (35) constituted by a valve that slides on the engine shaft, which the slide valve (35) can move between two positions in which it places the input pipe (34) in communication with one of the pipes (24, 25).

5 Claims, 5 Drawing Sheets

DRIVE UNIT, PARTICULARLY FOR BOATS

This invention relates to an improved drive unit for stern-drive boats, which is equipped with an innovative system for distributing pressurised oil to drive the propeller rotation reverse systems.

U.S. Pat. No. 7,010,994, filed by the same applicant, describes a drive unit for stern-drive boats which incorporates a system designed to reverse the propeller rotation.

In particular, the drive described in said patent comprises a pair of opposite coaxial bevel gears fitted idle on the engine shaft, which engage simultaneously with a third cogwheel, mounted on the drive shaft.

An oil-bath clutch is inserted into the body of each bevel gear so that the corresponding gear meshes with the engine shaft; inside said shaft are the pipes that convey lubricating oil to the two clutches together with pressurised oil that controls their engagement.

When one of the clutches is engaged, by conveniently directing pressurised oil via a hydraulic distributor, the drive shaft on which the propeller is mounted can be caused to rotate in either direction.

This drive unit is highly advantageous in terms of compactness, because it eliminates the need for a reverse drive to reverse the propeller rotation, which would enormously increase the cost of the assembly, as well as its size.

As stated in the above-mentioned US patent, the designers of this type of equipment face considerable problems regarding the distribution of the oil supplied to the clutches.

In these devices, the oil that activates the clutch engagement mechanisms operates at high pressure (approx. 20-25 bars), and this causes considerable seal problems: mechanical seal devices cannot be used because they would soon overheat in view of the speed at which the mobile parts slide against the fixed structure of the housing through which the lubricant pipes pass, thus making the device practically useless. In order to explain this problem, reference will be made to FIG. 1, which schematically illustrates a drive unit of this known type.

In FIG. 1, no. 1 indicates the engine shaft, on which a pair of coaxial bevel gears 2 and 3 are fitted idle opposite one another, both of which engage with a cogwheel 4 fitted to drive shaft 5.

Each bevel gear (2, 3) contains an oil-bath clutch (6 and 7 respectively) which can be operated independently, so that one of said bevel gears 2 and 3 meshes with said engine shaft to control the rotation of shaft 5 in one direction or the opposite direction.

This solution has proved highly advantageous, but the problem of oil distribution arises.

Passages must be provided for the lubricant oil conveyed to clutches 6 and 7, as well as passages through which pressurised oil is conveyed to the devices that control the engagement of the clutches, which said devices are also housed inside bevel gears 2 and 3.

The oil pipes pass through engine shaft 1. While this does not pose any particular problems for the clutch lubrication oil, which operates at low pressure and for which a "radial" connector can be used, the same does not apply to the oil that controls the engagement of the clutches.

As in this latter case the fluid operates at approx. 25 bars, radial connectors (ie. connectors which engage the side surface of the shaft) cannot be used, because in view of the high slide speed of the surfaces (the engine shaft rotates at approx. 2000-2500 rpm), mechanical seals cannot be employed, as they would quickly overheat in view of the speed of the moving parts in contact. Moreover, as all the oil inlets must be located on the same side of shaft 1 because the motor is located on the opposite side, and there are at least 3 oil feed pipes (one for lubricating oil and two for pressurised oil), the input of oil at the shaft head still presents considerable problems.

All these problems are now solved by this invention, which relates to an improved drive unit, particularly for boats, wherein pressurised oil is introduced through a single axial pipe into shaft 1, and a distributor formed on said shaft rotates together with the shaft and directs oil alternately towards two separate pipes leading to the control systems of the two clutches.

This solves the seal problems, because the relative speed between the parts at the point of oil input is very low.

This invention will now be described in detail, by way of example but not of limitation, by reference to the annexed figures wherein:

FIG. 1 schematically illustrates the general structure of a drive unit to which the teachings according to the invention are applied;

Figure 1:
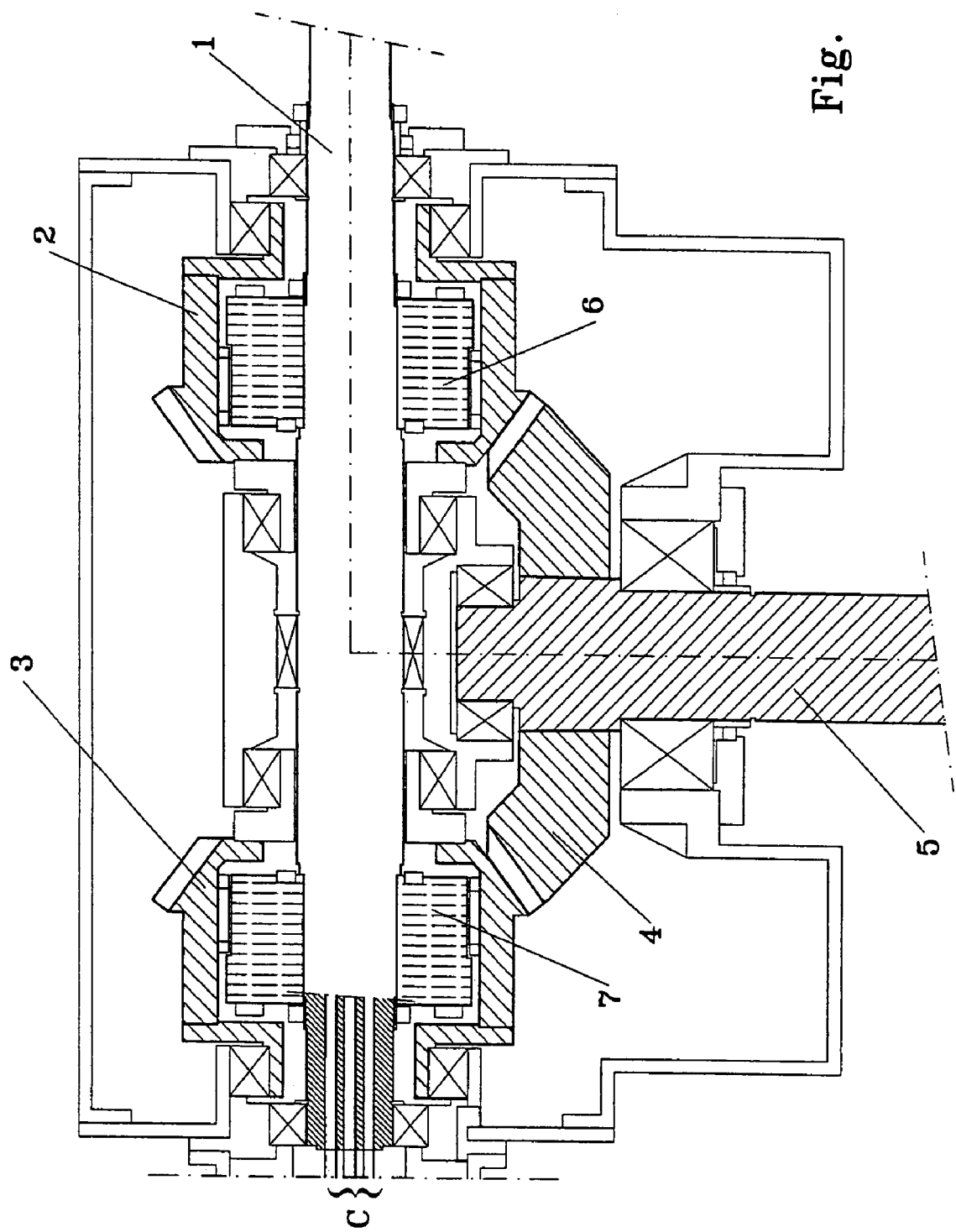
Figure 2:
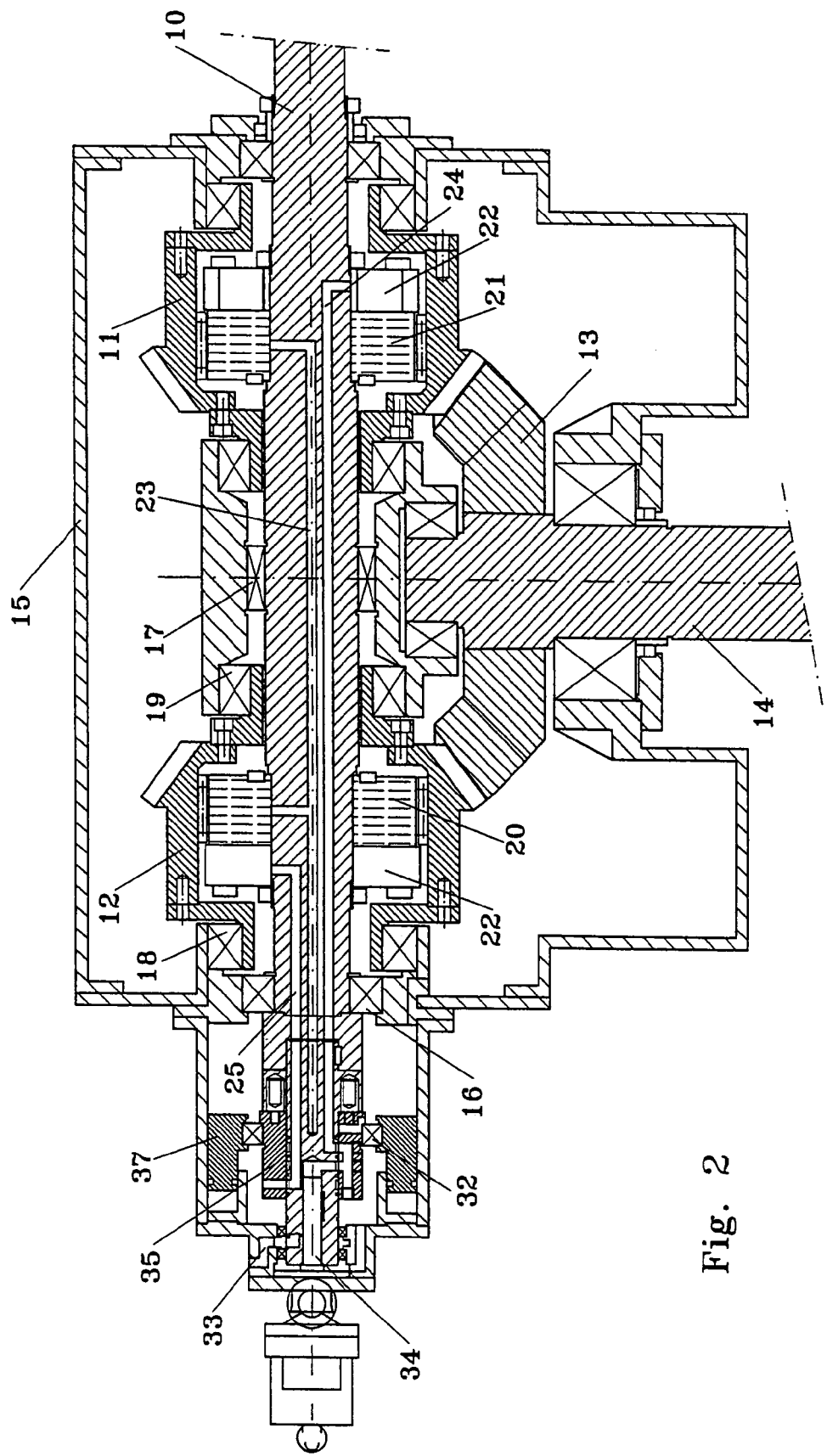
FIG. 2 shows a cross-section of a drive unit according to the invention with one clutch engaged.
Figure 3:
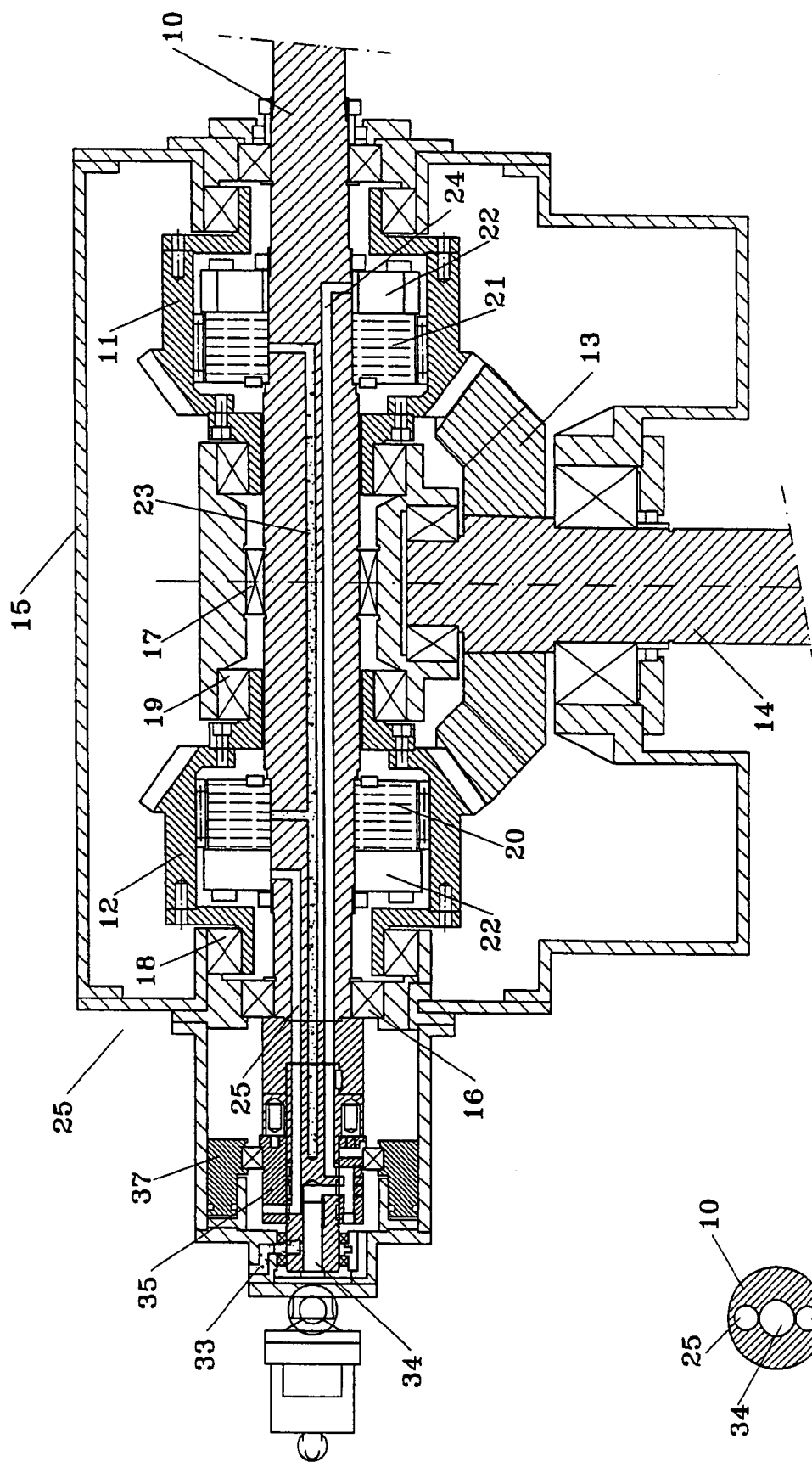
FIG. 3 shows a cross-section of the same drive unit with the second clutch engaged.
Figure 4:
FIG. 4 shows a cross-section of the engine shaft according to planes perpendicular to the axis.

In FIG. 2, no. 10 indicates the engine shaft or main shaft leading from the engine, on which are mounted a pair of bevel gears 11 and 12 which engage with a bevel gear 13 mounted on drive shaft 14, perpendicular to shaft 10.

Shaft 10 is mounted on housing 15 via bearings 16 and 17, and bevel gears 11 and 12 are mounted on the shaft via bearings 18 and 19. Bevel gears 11 and 12 can therefore rotate idle in relation to the main shaft.

Oil-bath clutches 20 and 21, driven by pistons 22, are fitted inside gears 11 and 12 respectively.

When one of pistons 22 is activated, the corresponding clutch engages, and the corresponding bevel gear meshes with main shaft 10.

The rotation motion is then transmitted by shaft 10 to the bevel gear, which in turn causes the rotation of gear 13 and the propeller mounted on an axle connected to shaft 14.

To reverse the direction of rotation, it is sufficient to disengage the clutch of the first bevel gear and engage that of the opposite gear.

The lubrication oil for clutches 20 and 21 is conveyed to them through a pipe 23 formed in shaft 10.

The pressurised oil conveyed to the pistons that drive clutches 20 and 21 passes through corresponding pipes 24 and 25, also formed in shaft 10.

Figure 5:
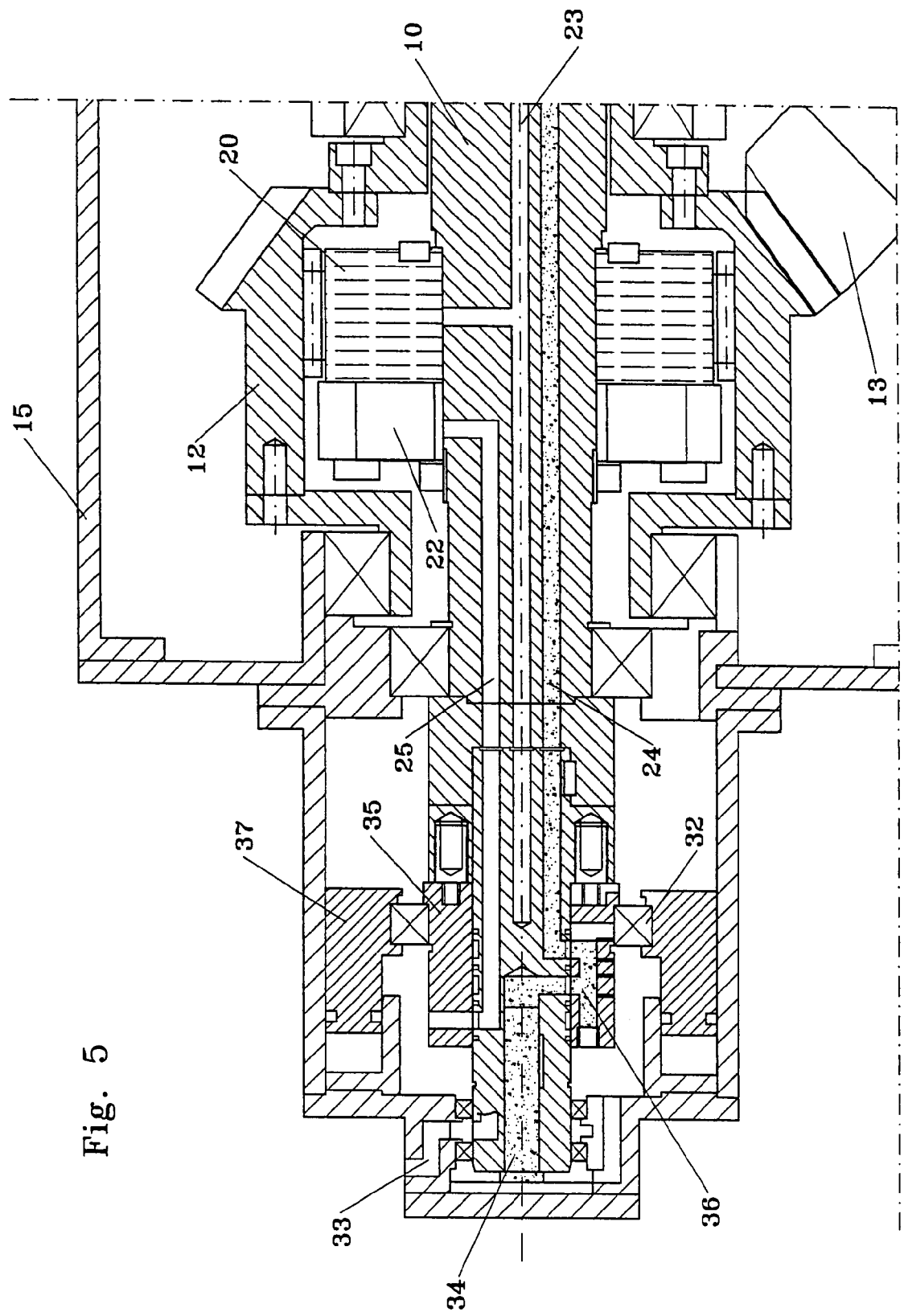
FIGS. 5 and 6 illustrate, again in cross-section, the system of distribution of pressurised oil in the engagement positions of the two clutches.
Figure 6:
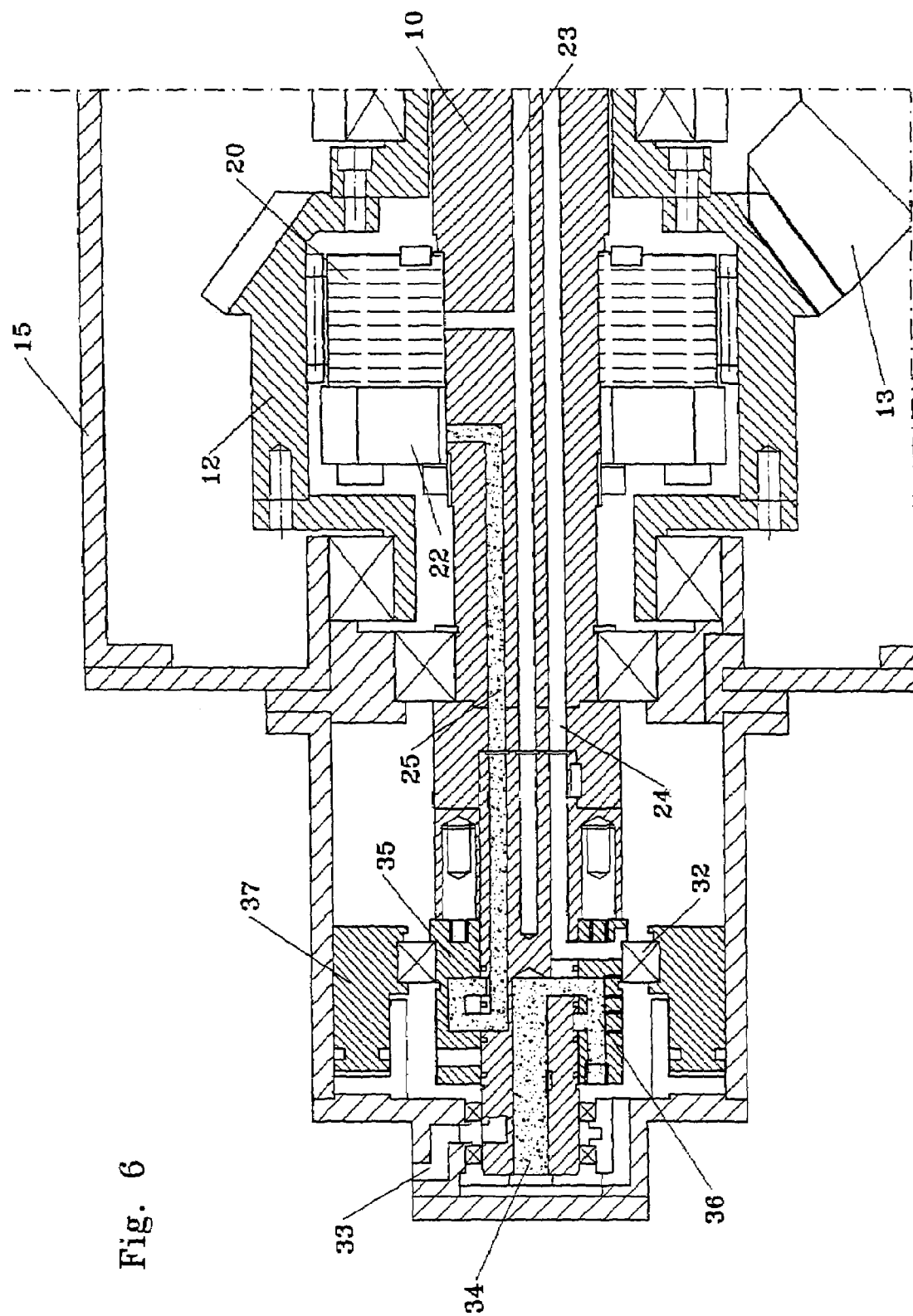

The oil distribution mechanism is more particularly illustrated in FIGS. 5 and 6.

Three pipes are formed in engine shaft 1: a first pipe 23, which conveys lubricant oil to the clutches, and a pair of pipes 24 and 25 which convey pressurised oil to the devices that control the engagement of each clutch.

Pipe 23 is fed via a radial connector 33, and as this oil is at low pressure, this solution does not cause any particular problems even though the speed between the shaft surface and the connector is high.

For the pressurised oil, a pipe 34 coaxial with shaft 1 is fitted at one end of said shaft. As this pipe is on the axis of rotation, the peripheral rotation speed is minimal, and it can consequently be easily fed via an axial distributor, despite the high pressure of the fluid.

Pipe 34 leads to a slide valve 35 made in the form of a sleeve fitted slidingly on the grooved end of engine shaft 10.

An annular chamber 36 which receives the pressurised fluid from pipe 34 is formed in said sleeve; according to the position of the sleeve, said chamber communicates with distribution channel 24 or 25 leading to the actuators of the two clutches.

According to a preferred embodiment of the invention, sleeve 35 is fitted via bearings 18 to a piston 37 which slides inside the housing.

Piston 37 pulls sleeve 35 with it in its movements, and due to bearings 36, sleeve 35 continues to rotate together with shaft 10.

Alternatively, sleeve (35) could be activated by a solenoid or lever.

During operation, oil at low pressure from the clutch discs is introduced into pipe 23 through radial connector 33 and circulates continuously through the device.

One clutch, for example clutch 11, is engaged to control the rotation of the propeller in one direction.

In this case piston 37 is moved to the position illustrated in FIG. 5, and pressurised oil flows from axial pipe 34 to chamber 36 and from there to pipe 24 leading to actuator 22 of clutch 21.

To control the rotation of the propeller in the opposite direction, piston 37 is moved to the position illustrated in FIG. 6 (to the left in FIGS. 5 and 6), so that the oil from pipe 34 flows into chamber 36 and from there to pipe 25 leading to actuator 22 of clutch 20, thus causing the second bevel gear 12 to mesh with the engine shaft.

As the movements of the actuators that engage the clutches are small, a minimal amount of oil is needed, and axial pipe 34 can therefore have a small diameter.

The peripheral speed at the pipe walls is therefore very low, and an axial connector can be used without any problems, despite the high oil pressure and the fast rotation speed of the axle.

This invention has been described with specific reference to a drive unit for stern-drive boats, but the same solution could also be used in all cases wherein two clutches are mounted on the same shaft, to be activated alternately. For example, this applies to clutch-operated power take-offs (PTO and PTI) for conventional naval reverse/reduction gearboxes, and the protection of the invention must therefore be deemed to extend to all these cases.

The invention claimed is:

1. Drive unit of the type comprising a transmission with two coaxial bevel gears (11, 12) fitted opposite one another on the same engine shaft (10), which engage a bevel gear (13) fitted to a shaft (14) perpendicular to the preceding one, and means designed to mesh said engine shaft with one or other of said bevel gears, constituted by clutches (20, 21) housed in the body of said bevel gears (12, 11) and controlled by a pressurised fluid, wherein pipes (24, 25), designed to convey said pressurised fluid, are formed in said engine shaft (10), wherein, in order to supply pressurised oil to said pipes (24, 25), an axial inlet pipe (34) is formed in the head of said engine shaft (10), which said axial pipe (34) feeds a distributor (35) constituted by a valve that slides on said engine shaft, which said slide valve (35) can move between two positions in which it places said input pipe (34) in communication with one of said pipes (24, 25).

2. Drive unit as claimed in claim 1, wherein said distributor (35) is mounted via bearings (32) inside a piston (37) which slides in the axial direction of said engine shaft.

3. Drive unit as claimed in claim 2, wherein said clutches (21, 22) are multi-disc clutches.

4. Drive unit as claimed in claim 3, wherein said clutches (21, 22) are the oil-bath type, with forced lubrication.

5. Drive unit as claimed in claim 2, further including a pipe formed inside said engine shaft (10), fed via a radial connector (33), for the lubrication of said clutches (21, 22).

* * * * *